United States Patent [19]

Earnest

[11] 4,267,692
[45] May 19, 1981

[54] COMBINED GAS TURBINE-RANKINE TURBINE POWER PLANT

[75] Inventor: Ernest R. Earnest, Hobe Sound, Fla.

[73] Assignee: Hydragon Corporation, Lake Park, Fla.

[21] Appl. No.: 36,516

[22] Filed: May 7, 1979

[51] Int. Cl.³ ............................................. F02C 6/18
[52] U.S. Cl. ............................ 60/39.18 R; 60/39.18 B
[58] Field of Search ................. 60/39.18 B, 39.18 R, 60/39.51 R, 39.52, 671

[56] References Cited

U.S. PATENT DOCUMENTS

| | | | |
|---|---|---|---|
| 3,007,306 | 11/1961 | Martin et al. | 60/39.18 R |
| 3,150,487 | 9/1964 | Mangan et al. | 60/39.18 R |
| 3,164,958 | 1/1965 | Pacault | 60/39.18 B |
| 3,703,807 | 11/1972 | Rice | 60/39.18 B |
| 3,785,145 | 1/1974 | Amann | 60/39.52 |
| 3,841,099 | 10/1974 | Somekh | 60/671 |
| 3,944,494 | 3/1976 | Mahler | 60/671 |

Primary Examiner—Louis J. Casaregola
Attorney, Agent, or Firm—Harness, Dickey & Pierce

[57] ABSTRACT

A combined gas turbine-Rankine cycle powerplant with improved part load efficiency is disclosed. The powerplant has a gas turbine with an organic fluid Rankine bottoming cycle which features an inter-cycle regenerator acting between the superheated vapor leaving the Rankine turbine and the compressor inlet air. The regenerator is used selectively as engine power level is reduced below maximum rated power.

24 Claims, 5 Drawing Figures

COMBINED GAS TURBINE-RANKINE TURBINE POWER PLANT

BACKGROUND OF THE INVENTION

It is known that the thermal efficiency of gas turbines and combined cycle gas turbine-Rankine cycle engines is significantly reduced when they are operating at reduced loads. This reduction of efficiency is particularly evident when a constant drive speed is required, such as with electric generator service.

Various mechanisms have been applied to gas turbines to reduce the part-power efficiency reduction, such as multiple rotors, variable flow path geometry, and cycle regeneration. U.S. Pat. Nos. 3,150,487 and 3,703,807 have attempted to improve part-power efficiency of combined cycle gas turbine with exhaust heat-driven steam Rankine bottoming cycle powerplants by selectively heating the compressor inlet air as the power level is reduced. In U.S. Pat. No. 3,150,487, the inlet air is heated by a preheater supplied with low pressure steam extracted from the Rankine vapor generator, or by direct mixing of a portion of the gas turbine exhaust gases with the compressor inlet air. In the latter case, the gases are extracted upstream of the steam vapor generator. In U.S. Pat. No. 3,703,807, a portion of the exhaust gases is recirculated to the compressor inlet in the same manner, except the recirculated products are extracted from the exhaust stack downstream of the vapor generator.

An object of the present invention is to provide a combined cycle powerplant which operates at high efficiency under part load conditions, and is an improvement over known powerplants. A further objective is to provide a means of improving the part load efficiency of a combined cycle gas turbine engine when operating at a constant speed and varying load. Still further objectives and advantages of the invention will become apparent upon consideration of the present disclosure and claims in view of the accompanying drawings.

DESCRIPTION OF PREFERRED EMBODIMENT

Figure 1:
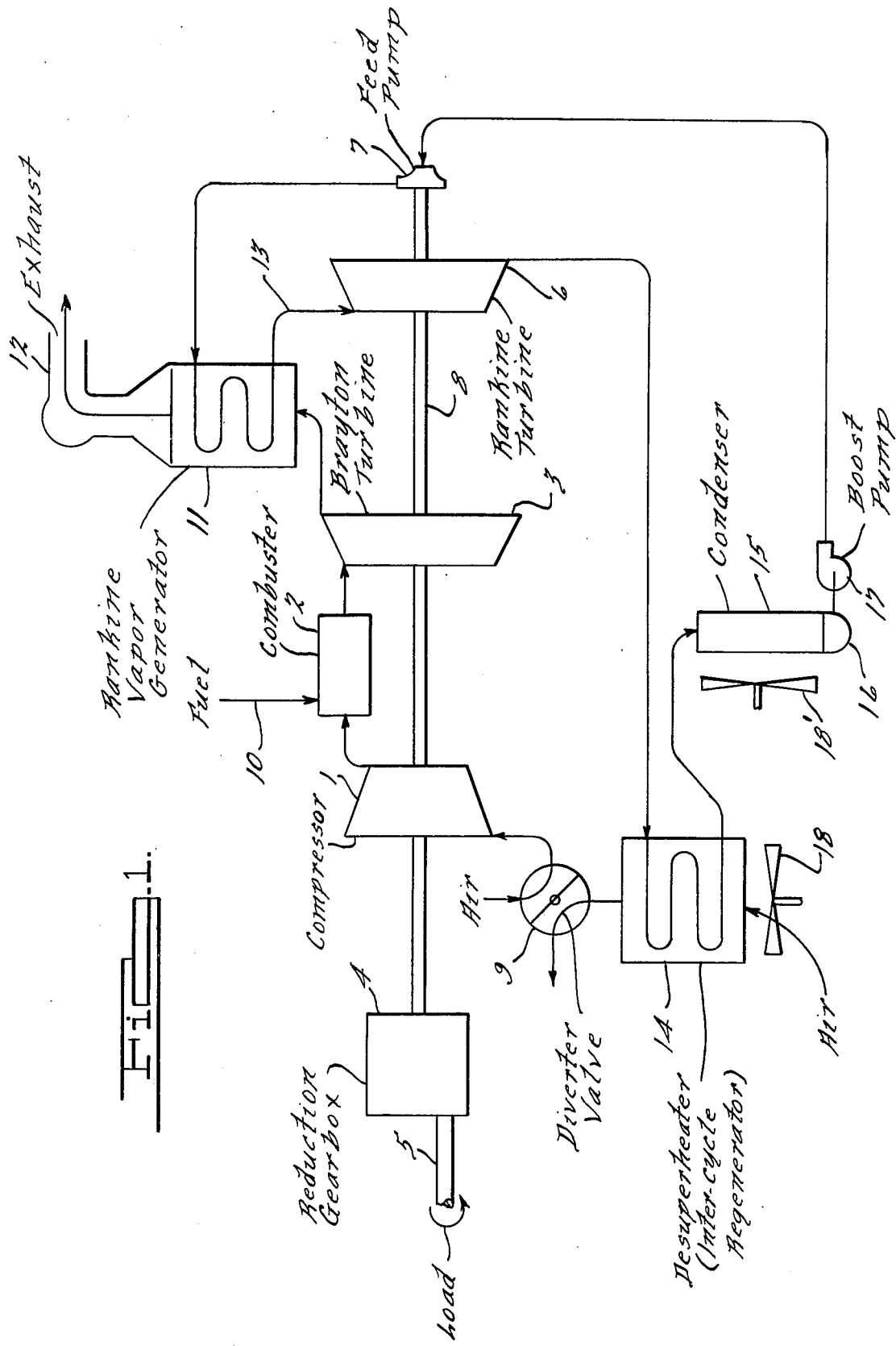
FIG. 1 depicts a schematic diagram of the inventive combined cycle engine operating at maximum power.

FIG. 1 is a schematic diagram of the inventive combined cycle powerplant operating at maximum power. A single shaft gas turbine system consisting of a compressor 1, a combustor or burner 2, and a Brayton turbine 3, is directly coupled to a reduction gearbox 4 and a load 5. An organic fluid Rankine turbine 6 and high pressure feed pump 7 are also directly coupled to the gas turbine rotor shaft 8. A diverter valve 9 directs ambient temperature air into the inlet of the compressor 1. Fuel is injected into the combustion chamber 2 via conduit 10. The exhaust products from the gas turbine engine pass through a Rankine vapor generator 11 and are discharged to the atmosphere through exhaust stack 12. High pressure vapor is directed to the Rankine turbine by conduit 13. The low pressure vapor leaving the Rankine turbine is passed through a desuperheater 14, a condenser 15, and accumulated in a sump 16. A boost pump 17 delivers the low pressure liquid to the high pressure feed pump 7. The desuperheater and condenser are air cooled by fans 18 and 18'. Air from the desuperheater 14 is diverted to return to the environment by diverter valve 9. When operating in the mode shown in FIG. 1, the engine operates at maximum pressure ratio and mass flow and is capable of maximum power generation.

Figure 2:
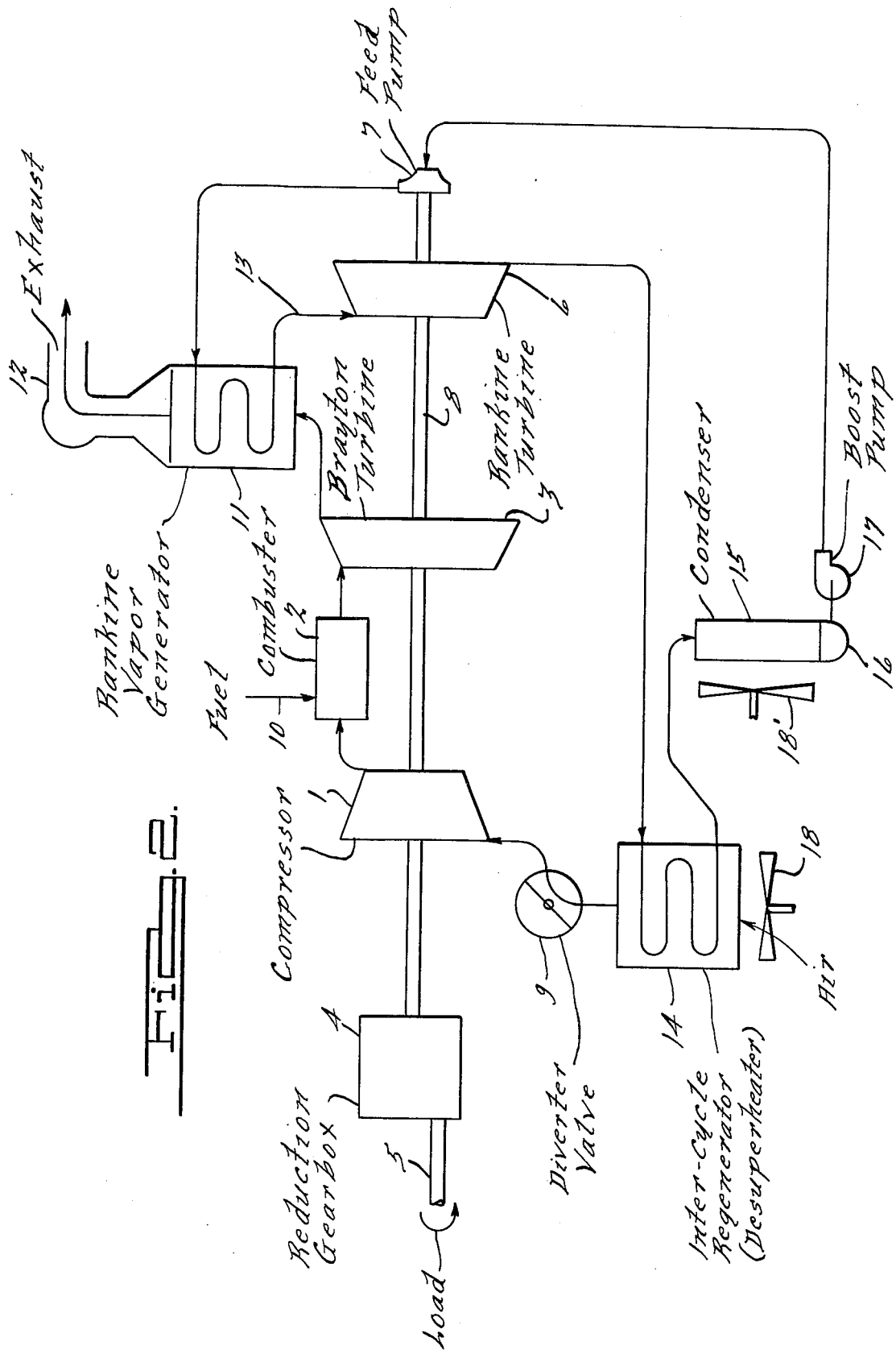
FIG. 2 is a schematic diagram of the inventive combined cycle engine operating at part load.

FIG. 2 depicts a schematic diagram of the powerplant when utilized at part load operation. The components and flow paths are the same as those described above with reference to FIG. 1, except that the diverter valve 9 has been articulated to direct the air heated by the Rankine desuperheater 14 into the inlet of the compressor 1. In this configuration, the Rankine desuperheater functions as an intercycle regenerator.

Figure 3:
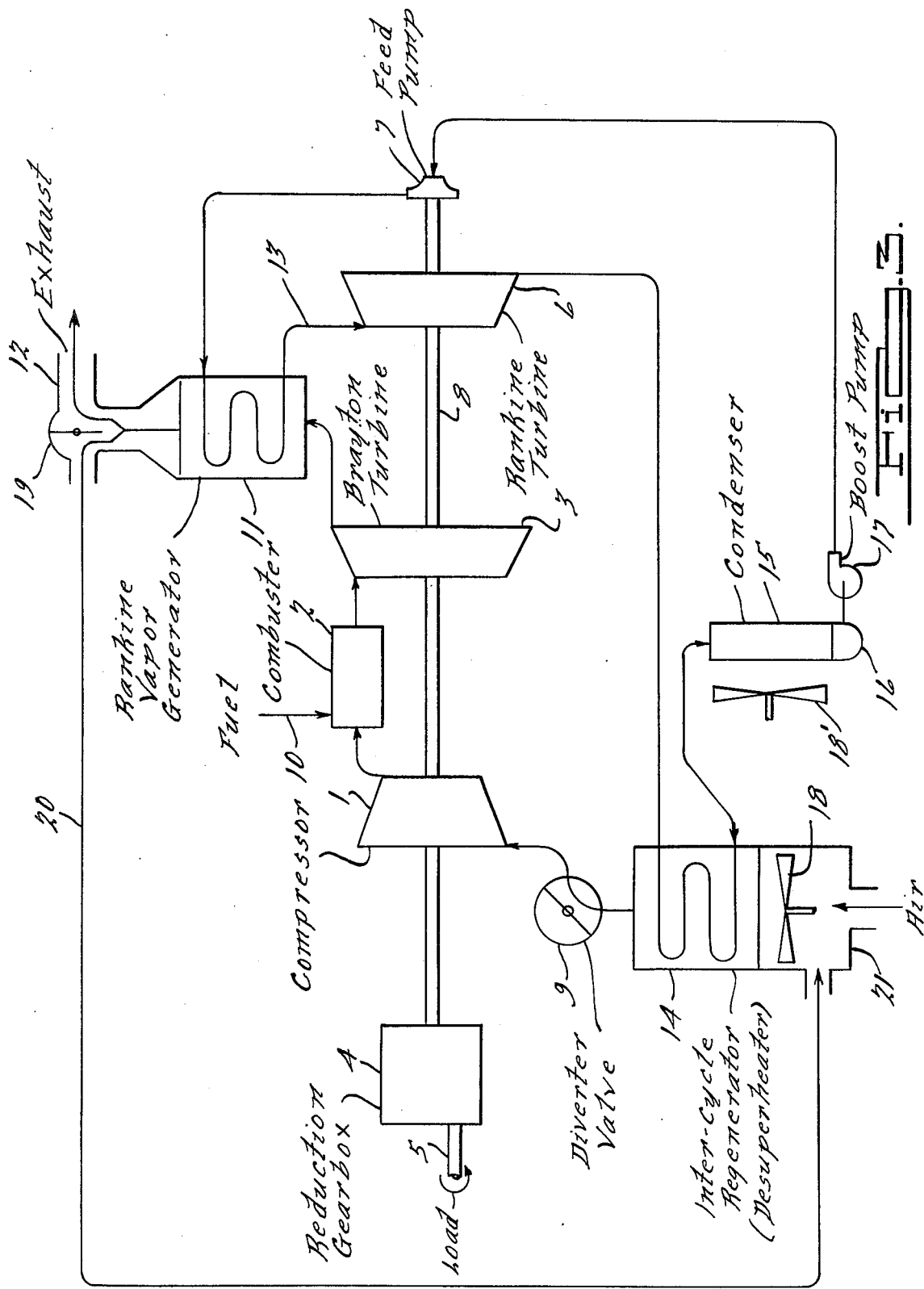
FIG. 3 is a schematic diagram of the inventive engine operating at part load with both exhaust gas recirculation and inter-cycle regenerator.

FIG. 3 depicts the same powerplant as shown in FIGS. 1 and 2 when adapted to utilize both exhaust gas recirculation and inter-cycle regeneration to provide a further increase in compressor inlet air temperature. In this embodiment, a second diverter valve 19 is provided in the exhaust stack 12 and adapted to direct a portion of the exhaust products via conduit 20 to a mixing chamber (plenum) 21 upstream of the desuperheater 14. The mixture of exhaust products and air is further heated in the desuperheater 14 before passing through diverter valve 9 and into the compressor 1. The valves 9 and 19 are operated in any conventional manner.

The preferred embodiment of the Rankine cycle utilizes an organic fluid as its working medium. Organic fluids tend to acquire increasing superheat upon expansion; that is, they exhibit a positive slope of the vapor saturation curve with increasing pressure as a function of entropy. Toluene, pyridine and benzine are examples of organic fluids which fall into this category and can be used in the present system.

Figure 4:
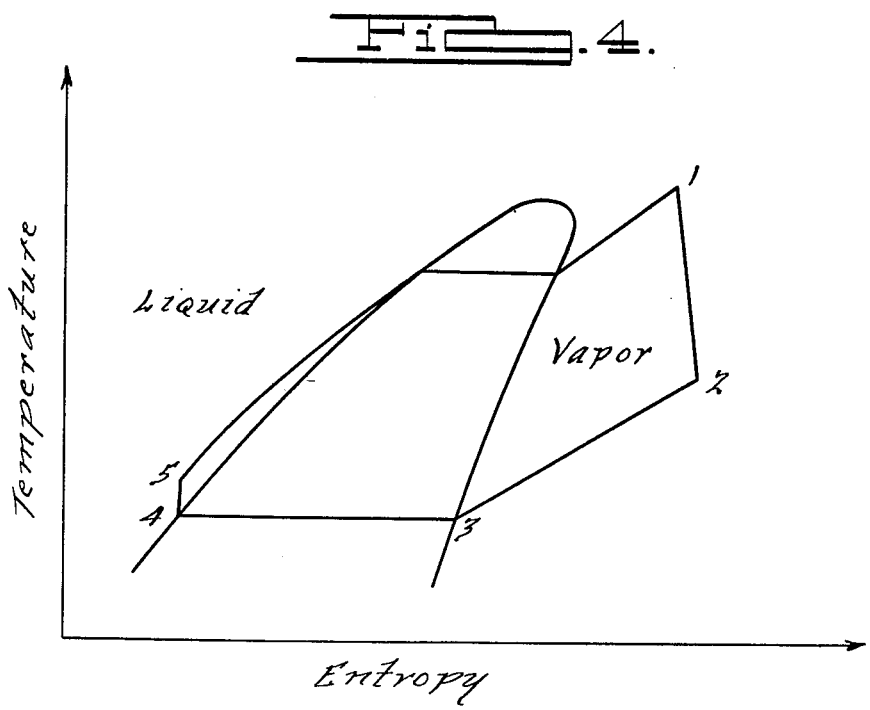
FIG. 4 shows a temperature-entropy graph for a typical organic fluid Rankine cycle.

A typical temperature-entropy diagram of a Rankine cycle operating loop is shown in FIG. 4. Referring to this Figure, the high pressure vapor enters the turbine at Station 1 and expands to Station 2, irreversibilities within the turbine causing 2 to be to the right of 1. Heat is extracted at constant pressure from Stations 2 and 3 desuperheating the fluid. From Stations 3 to 4, the working fluid is condensed. The liquid then is pumped to the required peak cycle pressure from Stations 4 to 5. Heat addition from 5 to 1 preheats and vaporizes the fluid to complete the cycle. In conventional practice, the heat extracted during desuperheat (Stations 2 to 3), is rejected to the environment or, in some cases, used to assist in preheating the high pressure liquid via a regenerator. In the present invention, the desuperheat energy is rejected to the environment during full power operation of the combined cycle powerplant and is used to preheat the compressor inlet air during part load operation via the inter-cycle regenerator. Also, the inter-cycle regeneration may take place with or without the application of exhaust gas recirculation for inlet pre-heating.

In order to maintain the highest efficiency, it is desirable to control the heat addition to the compressor inlet air in such a manner as to cause the engine to operate at the highest turbine inlet temperature consistent with engine durability and safety. The articulation of diverter valves 9 and 19 is therefore controlled as a function of turbine temperature. It is often impractical to measure turbine inlet temperature directly, however. The more usual practice is to measure turbine exhaust temperature and pressure ratio and, from known turbine characteristics, to simulate inlet temperature within the control logic. According to the present invention, a temperature responsive device monitors turbine exhaust temperature and a differential pressure sensitive device monitors compressor discharge pressure and ambient pressure to provide temperature and pressure ratio signals to the control.

Sensors and control systems which can be and preferably are to be used in the operation of the present invention are disclosed in the applicant's co-pending U.S. patent applications, Ser. No. 815,251 filed July 13, 1977 and Ser. No. 817,848 filed July 21, 1977, the disclosures of which are herein incorporated by reference.

At engine start up and idle, diverter valves 9 and 19 will be in the positions shown in FIG. 3 such that exhaust products will be recirculated and mixed with the air passing through the desuperheater 14 and into the inlet of the compressor 1. The ducting and limiting position of the exhaust gas recirculation valve 19 is designed to limit recirculation to that which is acceptable for efficient combustion within the engine. As engine power level is increased, the diverter valves will remain in the positions shown in FIG. 3 until the allowable maximum turbine temperature is achieved as determined by the previously mentioned control logic and temperature and pressure sensors. As fuel flow is further increased, first the exhaust recirculation valve 19 is articulated, and secondly the inter-cycle regenerator valve 9 is articulated in response to the temperature control in order to maintain turbine inlet temperature at or near the allowable maximum. At maximum power, the diverter valves 9 and 19 are fully closed so that the engine operates as shown in FIG. 1. It will be understood that many additional sensors and control devices which are known in the art can be provided to control the powerplant.

It is also possible to modify the configuration of the engine without departing from the concept of the invention. For instance, a valve and conduit arrangement can be provided which would divert the superheated Rankine flow directly to the condenser when compressor air preheating is not desired while the airflow path remained unchanged.

To understand the thermodynamic advantage of the present invention, one must first consider the alternatives proposed in U.S. Pat. Nos. 3,150,487 and 3,703,807. The first alternative proposed in U.S. Pat. No. 3,150,487, that is, air preheating via steam extracted from the vapor generator, causes a loss in available Rankine cycle work because the mass flow is reduced through the low pressure Rankine turbine. The second alternative proposed in U.S. Pat. No. 3,150,487, namely, air preheating via exhaust products extracted upstream of the Rankine vapor generator, again reduces the available Rankine work by reducing the products-side mass flow and heat input to the vapor generator. U.S. Pat. No. 3,703,807 is an improvement over these two alternatives in that the exhaust products to be recirculated to the inlet are extracted downstream of the vapor generator and thus do not adversely affect the Rankine cycle. However, because the products are cooler at this point, and because the portion of products recirculated is limited by the requirement of sufficient fresh air make-up for efficient combustion, the level of inlet preheating is limited to levels below those for optimum cycle efficiency. It may be seen that the present invention does not result in penalizing the Rankine cycle as does that of U.S. Pat. No. 3,150,487 because the heat extraction occurs downstream of the Rankine turbine, and that the potential for inlet air preheat is increased over U.S. Pat. No. 3,703,807 because the preheating does not dilute the oxygen bearing fresh air supplied to the combustor. Also, the present invention may be used in conjunction with exhaust gas recirculation to further increase the inlet air preheating.

It must be acknowledged that the opportunity for regeneration within the Rankine cycle is lost because of the inter-cycle regeneration. However, in most cases the overall gain in combined cycle efficiency through inter-cycle regeneration is greater than that resulting from the loss of potentially higher Rankine cycle efficiency. This gain in part-load cycle efficiency is particularly pronounced, but not limited to, the case of a single shaft gas turbine engine designed for a constant speed application such as generator drive. Normally, the airflow of such an engine remains relatively constant with changing load so that peak cycle temperature is substantially reduced at part load. Preheating the compressor inlet air acts to reduce the compressor pressure ratio and mass flow at a constant speed. Reduced mass flow causes higher peak cycle temperature and increased exhaust gas heat rejection to the Rankine cycle, thereby increasing Rankine work.

Figure 5:
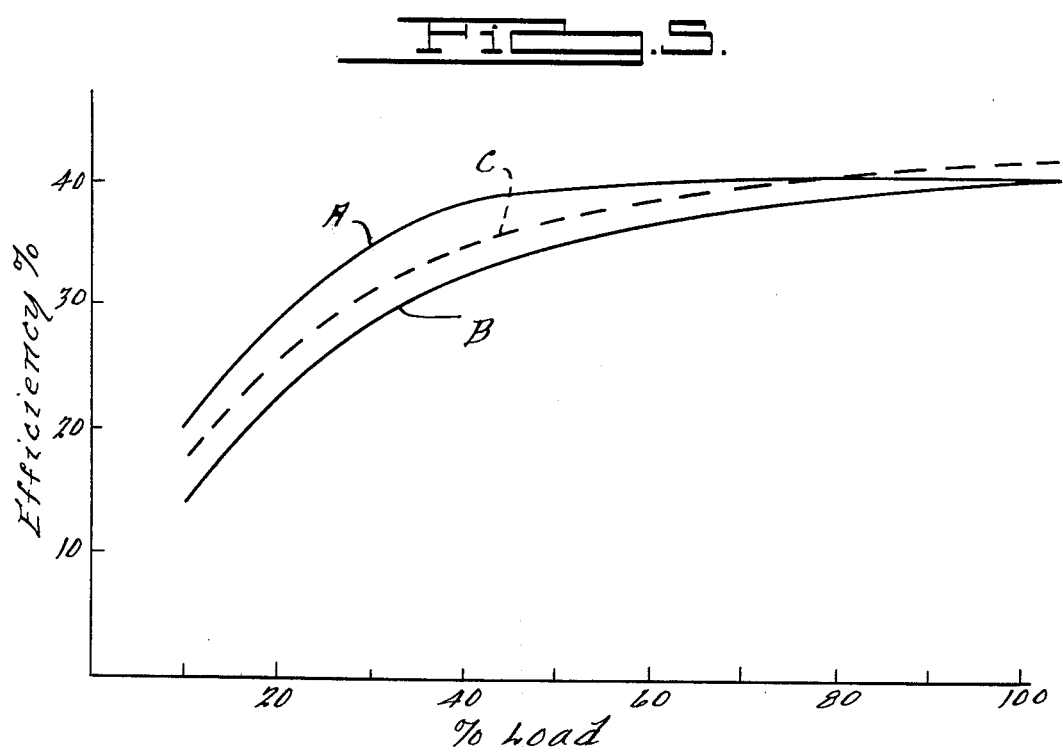
FIG. 5 is a graph showing thermal efficiency versus percent load for engines operating with and without inlet air heating at part load.

A computer modeling and performance analysis was carried out for the powerplant cycle as shown in FIG. 3 using exhaust gas recirculation and inter-cycle regeneration and for the same cycle using only exhaust gas recirculation. Performance was computed for single shaft engines operating at a constant speed and load varying from 10% to 100%. FIG. 5 shows the characteristic of thermal efficiency vs. % load. Curve A shows performance of the cycle based on the present invention as defined by FIG. 3, while Curve B shows performance at part-load for a cycle using exhaust gas recirculation alone. The performance shown in Curve B has lower efficiency.

The analysis as described above was carried out using a maximum 50% recirculation of exhaust gas for each cycle. Compressor inlet heating was maximized at part load until the maximum allowable turbine inlet temperature was reached and thereafter modulated to maintain constant turbine temperature. This was accomplished by first phasing out exhaust gas recirculation and, in the case of Curve A, mixing ambient temperature air with the heated air discharging from the inter-cycle regenerator. This analysis demonstrates the advantage of the present invention over U.S. Pat. No. 3,703,807.

A further analysis was carried out for the same powerplant without heated inlet air and with the inter-cycle regenerator replaced by a regenerator within the Rankine cycle. In each case the heat transfer effectiveness of the regenerator was assumed to be 75%. The performance of the Rankine regenerated powerplant is shown by the broken line Curve C. Although the Rankine regenerated powerplant provides the highest efficiency at maximum power, it is inferior to the powerplant cycle depicted by Curve A throughout most of the operating range. This last example demonstrates the advantages of the present invention over other alternatives.

The cycle analysis computations of the above examples were based on assumed component efficiencies and flow losses which are consistent with current state-of-the-art gas turbines of the 5 to 10 pound per second mass flow size. A peak pressure ratio of 8:1 was selected and turbine inlet temperature was limited to 2000° F. Pyridine was the Rankine fluid used in the analysis and peak Rankine cycle pressure and temperature was 500 psia and 700° F., respectively. The condensing temperature varied with power level from 110° to 160° F., while the compressor inlet temperature varied between ambient 60° F. at maximum load and 310° F. with maximum inlet heating.

The above analysis demonstrates the ability of the present invention to improve part-load efficiency. The present invention also has other potential part-load advantages, such as improved fuel vaporization and combustion through higher combustor inlet temperatures and lower net airflow and exhaust products.

While it will be apparent that the preferred embodiments illustrated herein are well calculated to fulfill the objectives above stated, it will be understood that the present invention is susceptible to modification, variation and change without departing from the scope of the invention, as defined by the following claims.

I claim:

1. A powerplant having a combined gas turbine engine and Rankine turbine engine, said powerplant comprising
   a gas turbine engine comprising a compressor, a gas turbine, and a burner and ambient air supply assembly for delivering air from the compressor and products of combustion from the burner to said gas turbine,
   a closed loop Rankine turbine engine comprising a vapor generator, a Rankine turbine, a desuperheater, a condenser and a liquid feed pump, said vapor generator heated by the exhaust of said gas turbine and delivering heat to the Rankine fluid for powering said Rankine turbine,
   means for directing air through said desuperheater and toward said compressor, and
   valve means upstream of said compressor for selectively introducing said heated air from said desuperheater into said compressor.

2. The powerplant as set forth in claim 1 wherein the Rankine fluid has an increased level of superheat upon isentropic expansion.

3. The powerplant as set forth in claim 1 wherein said Rankine fluid is an organic material.

4. The power plant as set forth in claim 1 further comprising means for introducing said heated air into said compressor and maintaining the inlet temperature of said gas turbine substantially at its maximum allowable temperature.

5. The powerplant as set forth in claim 1 further comprising means for recirculating a portion of the exhaust gases from said gas turbine and selectively introducing said portion of exhaust gases into said compressor.

6. The powerplant as set forth in claim 1 further comprising second valve means positioned in the exhaust of said gas turbine for directing a portion of said exhaust gases into said compressor.

7. The power plant as set forth in claim 6 further comprising means for mixing said portion of exhaust gases with the air passing through said desuperheater before said portion of exhaust gases are introduced into said compressor.

8. The power plant as set forth in claim 6 further comprising means for selecting and diverting a portion of said exhaust gases in accordance with a predetermined function of the gas turbine exit temperature and the compressor pressure ratio.

9. The powerplant as set forth in claim 1 wherein said gas turbine, compressor, Rankine turbine and liquid feed pump are all positioned on a single shaft.

10. An engine comprising in combination a main power turbine having an inlet and an exhaust, a compressor having an inlet and an outlet, valve means positioned upstream of said compressor for introducing ambient air into said compressor inlet, a combustion chamber situated adjacent said compressor and said main power turbine, said compressor and combustion chamber supplying the main power turbine with ambient air and products of combustion to power the same, an expansion turbine having an inlet and an outlet, a closed-loop Rankine cycle system for powering said expansion turbine, said Rankine cycle system using a working fluid, a vapor generator in said Rankine cycle system positioned to absorb heat from the exhaust of said main power turbine and connected to the inlet of said expansion turbine to deliver thereto working fluid vaporized in said vapor generator, a desuperheater connected to the outlet of said expansion turbine for transferring heat from said working fluid into air passing through said desuperheater, and a condenser and feed pump positioned in operating relationship with said desuperheater for condensing said working fluid and returning it to said vapor generator, said valve means selectively introducing said air passing through said desuperheater and heated thereby into said compressor inlet.

11. The engine as set forth in claim 10 wherein said working fluid is a material which has an increased level of superheat upon isentropic expansion.

12. The engine as set forth in claim 10 wherein said working fluid is an organic material.

13. The engine as set forth in claim 10 further comprising means for mixing said heated air from said desuperheater with said ambient air, for introducing the resultant air mixture into said compressor inlet and for maintaining the inlet temperature of said main power turbine substantially at its maximum allowable temperature.

14. The engine as set forth in claim 10 further comprising recirculation means for recirculating a portion of the exhaust gases of said main power turbine into said compressor inlet.

15. The engine as set forth in claim 14 wherein said recirculation means comprises a diverter means in communication with the outlet of said vapor generator for selecting a portion of said exhaust gases and delivering it to said valve means.

16. The engine as set forth in claim 15 further comprising means for mixing said portion of exhaust gases with the air passing through said desuperheater prior to being delivered to said valve means.

17. The engine as set forth in claim 10 further comprising means for delivering said portion of exhaust gases to said valve means and for selectively introducing said portion into said compressor inlet together with said heated air from said desuperheater.

18. The engine as set forth in claim 16 or 17 further comprising means for selecting and delivering said portion of exhaust gases for recirculation to the compressor and for maintaining the inlet temperature of said main power turbine substantially at its maximum allowable temperature.

19. The engine as set forth in claim 10 wherein said main power turbine, compressor and expansion turbine are mounted on a single shaft.

20. An engine comprising in combination a power turbine, a compressor, a burner and ambient air supply for delivering air from the compressor and products of combustion from the burner to said power turbine, a Rankine turbine, a first intercycle heat exchanger heated by the exhaust of said power turbine and delivering heat to the Rankine fluid upstream of said Rankine turbine, a closed-loop Rankine cycle system for powering said Rankine turbine, a second intercycle heat exchanger positioned in said Rankine cycle system for delivering heat to air passing through said second intercycle heat exchanger, first valve means and a second valve means, said first valve means recirculating a portion of said power turbine exhaust gases into said second valve means, said second valve means selectively introducing said ambient air, said heated air from said second intercycle heat exchanger, and said portion of said exhaust gases into said compressor.

21. The engine as set forth in claim 20 further comprising means for selectively mixing said ambient air, heated air and exhaust gases and for introducing them into said compressor in accordance with a predetermined function of the power turbine exit temperature and the compressor pressure ratio.

22. The engine as set forth in claim 20 wherein said portion of said exhaust gases is introduced into a mixing chamber upstream of said second intercycle heat exchanger and mixed with ambient air before said air is passed through said second intercycle heat exchanger.

23. The engine as set forth in claim 20 wherein said power turbine, compressor and Rankine turbine are mounted on a single shaft.

24. The engine as set forth in claim 20 wherein said Rankine fluid is an organic material having an increased level of superheat upon isentropic expansion.

* * * * *